(12) United States Patent
Kim et al.

(10) Patent No.: US 12,223,444 B2
(45) Date of Patent: Feb. 11, 2025

(54) ACCELERATOR FOR PROCESSING INFERENCE TASKS IN PARALLEL AND OPERATING METHOD THEREOF

(71) Applicants: Samsung Electronics Co., Ltd., Suwon-si (KR); Industry-Academic Cooperation Foundation, Yonsei University, Seoul (KR)

(72) Inventors: Ho Young Kim, Seoul (KR); Won Woo Ro, Seoul (KR); Sung Ji Choi, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 884 days.

(21) Appl. No.: 17/372,788

(22) Filed: Jul. 12, 2021

(65) Prior Publication Data
US 2022/0237487 A1    Jul. 28, 2022

(30) Foreign Application Priority Data
Jan. 25, 2021 (KR) .......... 10-2021-0010439

(51) Int. Cl.
*G06N 5/048* (2023.01)
*G06F 9/48* (2006.01)
*G06F 9/50* (2006.01)

(52) U.S. Cl.
CPC .......... *G06N 5/048* (2013.01); *G06F 9/4881* (2013.01); *G06F 9/5038* (2013.01); *G06F 9/5044* (2013.01); *G06F 9/5066* (2013.01)

(58) Field of Classification Search
None
See application file for complete search history.

(56) References Cited

U.S. PATENT DOCUMENTS 5,471,627 A * 11/1995 Means .................. G06N 3/04
706/42
11,625,453 B1 * 4/2023 Meyer ............... G06F 15/8046
706/15

(Continued)

FOREIGN PATENT DOCUMENTS

JP           2020-112901 A      7/2020
KR    10-2020-0092487 A      8/2020

(Continued)

OTHER PUBLICATIONS

Baek, Eunjin, et al., "A Multi-Neural Network Acceleration Architecture," *2020 ACM/IEEE 47th Annual International Symposium on Computer Architecture (ISCA)*, IEEE, 2020 (pp. 940-953).

(Continued)

*Primary Examiner* — Haimei Jiang
(74) *Attorney, Agent, or Firm* — NSIP Law

(57) ABSTRACT

Disclosed is an accelerator and a method of operating the accelerator including determining whether any group shares weights of a first group from among groups, determining a presence of an idle processing element (PE) array, in response to no group sharing the weights of the first group, and selecting a second group having a memory time overlapping a computation time of the first group from among the groups, in response to the idle PE array being present.

20 Claims, 10 Drawing Sheets

(56) References Cited

U.S. PATENT DOCUMENTS

2018/0365554 A1* 12/2018 van den Oord ........ G06N 3/096
2020/0226201 A1* 7/2020 Ma ......................... G06N 3/063
2021/0201120 A1* 7/2021 Shibata .................... G06N 3/08

FOREIGN PATENT DOCUMENTS

KR  10-2020-0093093 A    8/2020
WO  WO 2020/104038 A1    5/2020

OTHER PUBLICATIONS

Choi, Yujeong, et al., "PREMA: A Predictive Multi-task Scheduling Algorithm for Preemptible Neural Processing Units," *2020 IEEE International Symposium on High Performance Computer Architecture (HPCA). IEEE*, 2020 (pp. 1-15).

* cited by examiner

ACCELERATOR FOR PROCESSING INFERENCE TASKS IN PARALLEL AND OPERATING METHOD THEREOF

CROSS-REFERENCE TO RELATED APPLICATIONS

This application claims the benefit under 35 USC § 119(a) of Korean Patent Application No. 10-2021-001 0439 filed on Jan. 25, 2021, in the Korean Intellectual Property Office, the entire disclosure of which is incorporated herein by reference for all purposes.

BACKGROUND

1. Field

The following description relates to an accelerator for processing inference tasks in parallel.

2. Description of Related Art

With the development of artificial intelligence (AI) technology, there is an increasing need for independent hardware dedicated to AI. For example, AI may perform resource-intensive inference and learning tasks. As such, various devices have been developed as exclusive hardware for implementing and executing AI.

The exclusive hardware for AI may be implemented by, for example, a central processing unit (CPU), a graphics processing unit (GPU), or implemented by a field-programmable gate array (FPGA), and an application-specific integrated circuit (ASIC) of changeable use.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of operating an accelerator, the method comprising determining whether any group shares weights of a first group from among groups, determining a presence of an idle processing element (PE) array, in response to no group sharing the weights of the first group, and selecting a second group having a memory time overlapping a computation time of the first group from among the groups, in response to the idle PE array being present.

The groups may include groups of sublayers generated by dividing layers of one or more inference tasks.

The determining the presence of the idle PE array may include comparing a size of PE arrays and a size of the weights of the first group, and determining the idle PE array, in response to the size of the weights of the first group being less than the size of the PE arrays.

The selecting of the second group may include selecting the second group from among the groups based on a size of PE arrays in the accelerator, a capacity of an on-chip memory in the accelerator, and a predicted value of the computation time of the first group.

The selecting of the second group may include identifying one or more groups with no dependency on the first group based on a table including information of the groups, enqueuing the identified one or more groups in a candidate queue, determining whether a sum of a size of the weights of the first group and a size of weights of a first enqueued group in the candidate queue exceeds a size of PE arrays, determining whether a predicted value of a transfer time of the weights of the first enqueued group exceeds a time value calculated based on a residual capacity of the on-chip memory, in response to the sum of the size of the weights being less than the size of the PE arrays, determining whether the predicted value of the transfer time of the weights of the first enqueued group is less than a predicted value of a computation time of the first group, in response to the predicted value of the transfer time of the weights of the first enqueued group being less than the time value, and selecting the first enqueued group as the second group, in response to the predicted value of the transfer time of the weights of the first enqueued group being less than the predicted value of the computation time of the first group.

The predicted value of the transfer time may be a predicted value of a time to transfer the weights of the first enqueued group from a memory of a host to the accelerator.

The memory time of the second group may be a time to transfer weights of the second group to the accelerator.

The operating method may include selecting a third group from among groups with no dependency on the first and second groups based on a size of PE arrays in the accelerator, a residual capacity of an on-chip memory in the accelerator, a predicted value of the computation time of the first group, and a predicted value of a transfer time of weights of the second group, in response to the sum of a size of the weights of the first group and a size of the weights of the second group being less than a size of the PE arrays.

The selecting of the third group may include calculating a difference value between the predicted value of the computation time of the first group and the predicted value of the transfer time of the weights of the second group, calculating a sum of the size of the weights of the first group, the size of the weights of the second group, and a size of weights of any one of the groups with no dependency on the first and second groups, determining whether the calculated sum exceeds the size of the PE arrays, determining whether a predicted value of a transfer time of the weights of the any one group exceeds a time value calculated based on the residual capacity of the on-chip memory in the accelerator, in response to the calculated sum being less than the size of the PE arrays, determining whether a predicted value of a transfer time of weights of the any one group is less than the calculated difference value, in response to the predicted value of the transfer time of the weights of the any one group being less than the time value, and selecting the any one group as the third group, in response to the predicted value of the transfer time of the weights of the any one group being less than the calculated difference value.

The first group may be a highest priority group from among the groups.

In another general aspect, there is provided an accelerator, including processing element (PE) arrays, and a scheduler configured to determine whether any group shares weights of a first group among groups, to determine a presence of an PE array from among the PE arrays, in response to no group sharing the weights of the first group, and to select a second group having a memory time overlapping a computation time of the first group from among the groups, in response to the idle PE array being present.

The groups may include groups of sublayers generated by dividing layers of one or more inference tasks.

The scheduler may be configured to compare a size of the PE arrays and a size of the weights of the first group, and to determine the idle PE array, in response to the size of the weights of the first group being less than the size of the PE arrays.

The scheduler may be configured to select the second group from among the groups based on a size of the PE arrays, a capacity of an on-chip memory in the accelerator, and a predicted value of the computation time of the first group.

The scheduler may be configured to identify one or more groups with no dependency on the first group based on a table including information of the groups, enqueue the identified one or more groups in a candidate queue, determine whether a sum of a size of the weights of the first group and a size of weights of a first enqueued group in the candidate queue exceeds a size of PE arrays, determine whether a predicted value of a transfer time of the weights of the first enqueued group exceeds a time value calculated based on a residual capacity of the on-chip memory, in response to the sum of the size of the weights being less than the size of the PE arrays, determine whether the predicted value of the transfer time of the weights of the first enqueued group is less than a predicted value of a computation time of the first group, in response to the predicted value of the transfer time of the weights of the first enqueued group being less than the time value, and select the first enqueued group as the second group, in response to the predicted value of the transfer time of the weights of the first enqueued group being less than the predicted value of the computation time of the first group.

The predicted value of the transfer time may include a predicted value of a time to transfer the weights of the first enqueued group from a memory of a host to the accelerator.

The memory time of the second group may include a time to transfer weights of the second group to the accelerator.

The scheduler may be configured to select a third group from among groups with no dependency on the first and second groups based on a size of the PE arrays, a residual capacity of an on-chip memory in the accelerator, a predicted value of the computation time of the first group, and a predicted value of a transfer time of weights of the second group, in response to the sum of a size of the weights of the first group and a size of the weights of the second group being less than a size of the PE arrays.

The scheduler may be configured to calculate a difference value between the predicted value of the computation time of the first group and the predicted value of the transfer time of the weights of the second group, calculate a sum of the size of the weights of the first group, the size of the weights of the second group, and a size of weights of any one of the groups with no dependency on the first and second groups, determine whether the calculated sum exceeds the size of the PE arrays, determine whether a predicted value of a transfer time of the weights of the any one group exceeds a time value calculated based on the residual capacity of the on-chip memory in the accelerator, in response to the calculated sum being less than the size of the PE arrays, determine whether a predicted value of a transfer time of weights of the third group is less than the calculated difference value, in response to the predicted value of the transfer time of the weights of the any one group being less than the time value, and select the any one group as the third group, in response to the predicted value of the transfer time of the weights of the any one group being less than the calculated difference value.

The first group may be a highest priority group from among the groups.

Other features and aspects will be apparent from the following detailed description, the drawings, and the claims.

Figure 1:
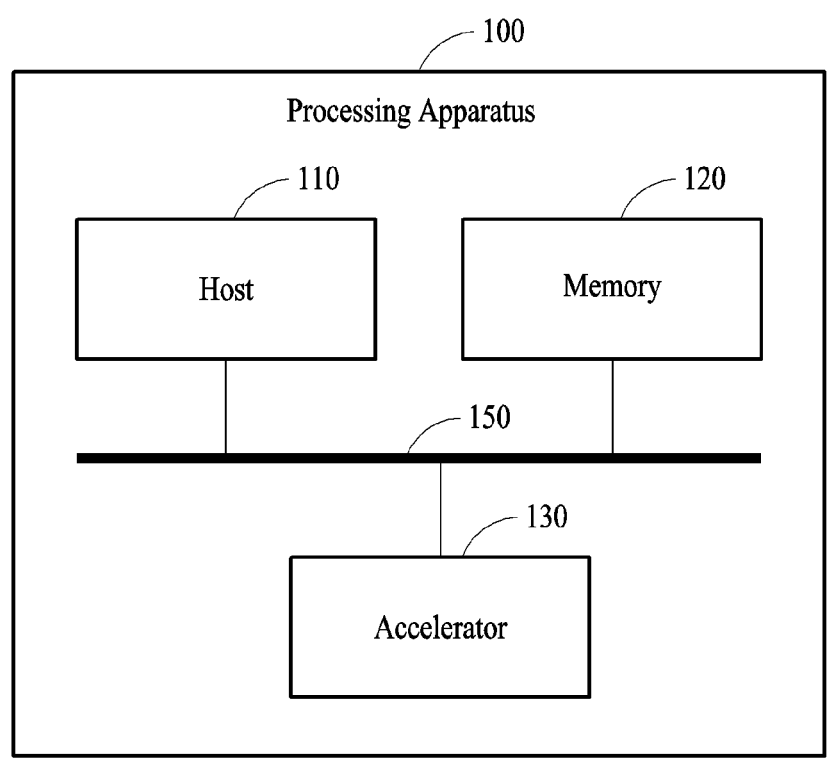
FIG. 1 illustrates an example of a processing apparatus including a host and an accelerator.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for the purpose of describing particular examples only and is not to be limiting of the examples. As used herein, the singular forms (for example, "a", "an", and "the") are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or a combination thereof, but do not preclude the presence or addition of one or more other features, integers, steps, operations, elements, components, numbers, and/or combinations thereof.

The use of the term "may" herein with respect to an example or embodiment (e.g., as to what an example or embodiment may include or implement) means that at least one example or embodiment exists where such a feature is included or implemented, while all examples are not limited thereto.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 illustrates an example of a processing apparatus including a host and an accelerator.

Referring to FIG. 1, a processing apparatus 100 includes a host 110, a memory 120, and an accelerator 130.

The processing apparatus 100 may be included in a server. However, examples are not limited thereto, and the processing apparatus 100 may be included other devices, such as, for example, a mobile terminal (for example, a smartphone) a smart device, a laptop computer, a tablet personal computer (PC), a PC, a mobile internet device (MID), a personal digital assistant (PDA), an enterprise digital assistant (EDA), a digital camera, a portable multimedia player (PMP), a personal navigation device or portable navigation device (PND), a handheld game console, an e-book, a smart device, a digital television (DTV), an artificial intelligence (AI) speaker, a home appliance such as a television, a smart television, a refrigerator, a smart home device, a vehicle such as a smart vehicle, an Internet of Things (IoT) device, a wearable electronic device, such as a smart watch, or smart glasses, an electric vehicle, an electronic device, a robot, or a security kiosk.

The host 110, the memory 120, and the accelerator 130 may communicate with each other via a bus 150.

The host 110 may include, for example, a microprocessor, single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a microcomputer, a processor core, a multi-core processor, and a multiprocessor, a central processing unit (CPU), a controller and an arithmetic logic unit (ALU), a DSP, a graphics processing unit (GPU), a neural processing unit (NPU), a field-programmable gate array (FPGA), an application-specific integrated circuit (ASIC), a programmable logic unit (PLU), or an application processor (AP).

The host 110 may receive an inference request and data from one or more devices. The devices may include, for example, smartphones, tablet PCs, vehicles, and IoT devices. However, examples are not limited thereto. The inference request may be a request for the accelerator 130 to perform an inference task and generate an inference result from the data received from the devices. The inference request may include, for example, object recognition, pattern recognition, computer vision, speech recognition, machine translation, machine interpretation, recommendation services, and autonomous driving. However, examples are not limited thereto. The data received from the devices may correspond to input data used by the accelerator 130 to perform the inference task.

The inference task may be performed using neural network, or an artificial neural network (ANN). The ANN described herein may generate mapping between input patterns and output patterns, and may have a generalization capability to generate a relatively correct output with respect to an input pattern that has not been used for training. The neural network may indicate an overall model having a problem-solving ability as nodes constituting the network through synaptic connections change the intensity of the synaptic connections through learning.

A node of the neural network may include a combination of weights or biases. The neural network may include one or more layers including one or more nodes. The one or more layers may include an input layer, hidden layers, and an output layer. The neural network may infer a result that is desired to be predicted from an input by changing a weight of a node through learning.

The neural network may include for example, any one or any combination of a convolutional neural network (CNN), and a recurrent neural network (RNN), a perceptron, a multilayer perceptron, a feedforward (FF) network, a radial basis function (RBF) network, a deep FF (DFF) network, a long short-term memory (LSTM), a gated recurrent unit (GRU), an autoencoder (AE), a variational AE (VAE), a denoising AE (DAE), a sparse AE (SAE), a Markov chain (MC), a Hopfield network (HN), a Boltzmann machine (BM), a restricted BM (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN). In an example, at least a portion of the plurality of layers in the neural network may correspond to the CNN, and another portion thereof may correspond to the FCN. In this case, the CNN may be referred to as convolutional layers, and the FCN may be referred to as fully connected layers.

The memory 120 is a memory disposed outside the accelerator 130, and may be, for example, a dynamic random-access memory (DRAM), a static RAM (SRAM), a thyristor RAM (T-RAM), a zero-capacitor RAM (Z-RAM), a twin-transistor RAM (TTRAM), or a high bandwidth memory (HBM). However, examples are not limited thereto. The memory 120 may store weights of the neural network and the input data described above.

The accelerator 130 may also be referred to as a neural processing unit (NPU) or a neural processor.

In an example, the accelerator 130 may include processing elements (PEs) and an on-chip memory. The number of PE arrays may be, for example, 16, and the size of each PE array may be, for example, 128×128. The number of PE arrays and the size of each PE array described above are exemplary, and the number of PE arrays and the size of each PE array are not limited to the above example. The on-chip memory may also be referred to as an on-chip buffer. The on-chip memory may include a scratchpad memory and a static random-access memory (SRAM). The weights and input data stored in the memory 120 may be transferred to the on-chip memory.

The host 110 may divide each of the layers included in the inference task into one or more sublayers during the runtime of a compiler, and generate a group including the sublayers for each layer of the inference task. Further, the host 110 may record information of each of the groups generated from the inference task in a scheduling table of the inference task, and transfer the scheduling table to the accelerator 130. This will be described further below with reference to FIG. 2.

The accelerator 130 may assign the groups to the PE arrays based on a dynamic scheduling algorithm, which will be described later, to process the multiple groups (or inference tasks) in parallel. Accordingly, groups (or inference tasks) sharing the same weights may be processed with priority in parallel. Further, a computation time for a PE array in the accelerator 130 to perform an operation for a group may overlap a memory time used to transfer a weight of another group to another PE array. Thus, the resource efficiency may improve.

Figure 2:
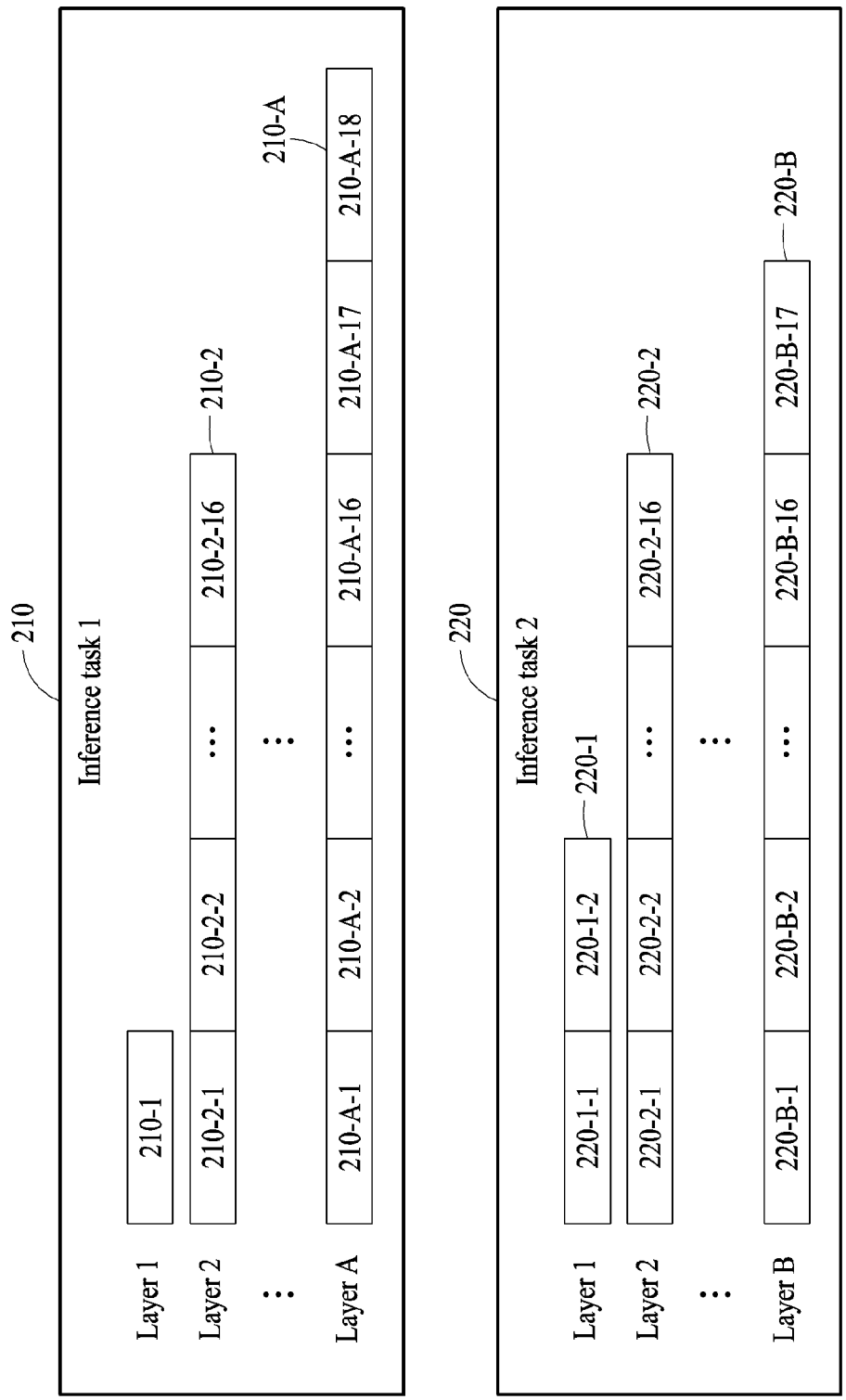
FIGS. 2 and 3 illustrate examples of operations of a host.
Figure 3:
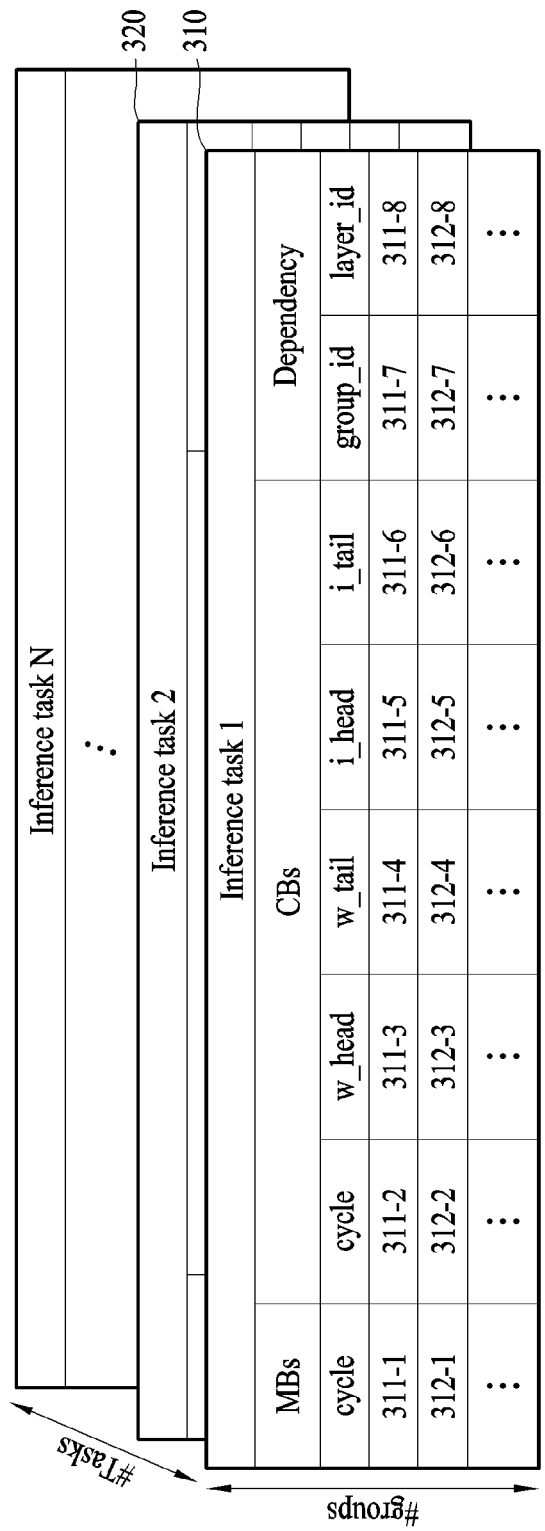

FIGS. 2 and 3 illustrate examples of operations of a host.

Referring to FIG. 2, an inference task 1 210 is shown. The inference task 1 210 may include a layer 1 to a layer A. In an example, the accelerator 130 may include sixteen PE arrays.

In an example, the host 110 may generate sublayers by dividing each layer of the inference task 1 210 based on the PE array size (for example, 128×128), and form, for each layer, a group including a number of sublayers. In an example, the number of sublayers correspond to the number of PE arrays (for example, 16). If a layer is divided into less than sixteen sublayers, the host 110 may form a group including the corresponding sublayers. If a layer is divided into more than sixteen sublayers, the host 110 may separately form a group including sixteen sublayers and another group including the remaining sublayers.

In the example of FIG. 2, the size of the layer 1 of the inference task 1 210 may be the same as the PE array size. In this example, the layer 1 210-1 of the inference task 1 is not divided into sublayers. The host 110 may generate sixteen sublayers 210-2-1 to 210-2-16 by dividing the layer 2 210-2 of the inference task 1 210 based on the PE array size. The host 110 may generate eighteen sublayers 210-A-1 to 210-A-18 by dividing the layer A 210-A of the inference task 1 210 based on the PE array size.

The host 110 may form a group 1_1 including the layer 1 210-1. Since the layer 2 210-2 of the inference task 1 is divided into sixteen sublayers 210-2-1 to 210-2-16, the host 110 may form a group 1_2 including the sixteen sublayers 210-2-1 to 210-2-16. The layer A 210-A of the inference task 1 is divided into eighteen sublayers 210-A-1 to 210-2-18. In this case, the host 110 may form a group 1_A_1 including sixteen sublayers 210-A-1 to 210-A-16 and a group 1_A_2 including the remaining sublayers 210-A-17 and 210-A-18).

Table 1 below shows the group for each layer of the inference task 1 210.

TABLE 1

| Layer | Group |
| --- | --- |
| Layer 1 210-1 | Group 1_1 |
| Layer 2 210-2 | Group 1_2 |
| ... | ... |
| Layer A 210-A | Group 1_A_1 and Group 1_A_2 |

The host 110 may record information of the group for each layer of the inference task 1 210 in a scheduling table 310 of the inference task 1 210. The information of the group may include, for example, memory block (MB) information, computation block (CB) information, and dependency information of the group.

The MB information may include a cycle of the group. The cycle in the MB information may indicate a predicted value of a transfer time (hereinafter, the memory time) consumed to transfer data needed for an operation for the group (for example, weights of the group) from the memory 120 to the accelerator 130 (or the PE arrays in the accelerator 130).

The CB information may include a cycle of the group. The cycle in the CB information may indicate a predicted value of a time consumed to perform an operation for the group (hereinafter, the computation time). Further, the CB information may include a memory address of the weights of the group and a memory address of the input data of the group.

The dependency information may include an identifier of a following group with dependency on the group and an identifier of the layer of the group.

In FIG. 3, an example of the scheduling table 310 of the inference task 1 210 is shown.

In the example of FIG. 3, the host 110 may calculate a predicted value of a transfer time consumed to transfer weights of the group 1_1 from the memory 120 to the accelerator 130 based on the size of the weights of the group 1_1, and record the calculated predicted value in an item 311-1. The host 110 may calculate a predicted value of a time consumed to perform an operation for the group 1_1 based on the size of input data of the group 1_1, and record the calculated predicted value in an item 311-2. The host 110 may record a memory start address and a memory end address of the weights of the group 1_1 in an item 311-3 and an item 311-4, respectively. The host 110 may record a memory start address and a memory end address of the input data of the group 1_1 in an item 311-5 and an item 311-6, respectively. The host 110 may record an identifier of a following group with dependency on the group 1_1 in an item 311-7. For example, the group 1_2 may be the following group with dependency on the group 1_1. The host 110 may record an identifier of the group 1_2 in the item 311-7. Since the layer of the group 1_1 is the layer 1 210-1, the host 110 may record an identifier of the layer 1 210-1 in an item 311-8.

Like the recording of the information of the group 1_1 in the scheduling table 310, the host 110 may record information of the group 1_2 in the scheduling table 310. In the example of FIG. 3, the host 110 may record a predicted value of a memory time of the group 1_2 in an item 312-1. The host 110 may record a predicted value of a calculation time of the group 1_2 in an item 312-2. The host 110 may record a memory start address and a memory end address of the weights of the group 1_2 in an item 312-3 and an item 312-4, respectively. The host 110 may record a memory start address and a memory end address of the input data of the group 1_2 in an item 312-5 and an item 312-6, respectively.

The host 110 may record an identifier of a following group with dependency on the group 1_2 in an item 312-7, and since the layer of the group 1_2 is the layer 2 210-2, may record an identifier of the layer 2 210-2 in an item 312-8.

The host 110 may record information of each of the remaining groups of the inference task 1 210 in the scheduling table 310.

The host 110 may transfer the scheduling table 310 to the accelerator 130.

Referring to FIG. 2 again, the host 110 may receive data and an inference request from a device and thus, have an inference task 2 220.

The inference task 2 220 may include a layer 1 220-1 to a layer B 220-B.

The host 110 may generate one or more sublayers by dividing each layer of the inference task 2 220 based on the PE array size, and form a group including sixteen sublayers for each layer.

In the example of FIG. 2, the host 110 may generate two sublayers 220-1-1 and 220-1-2 by dividing the layer 1 220-1 of the inference task 2 220 based on the PE array size. The host 110 may generate sixteen sublayers 220-2-1 to 220-2-16 by dividing the layer 2 220-2 of the inference task 2 220 based on the PE array size. The host 110 may generate seventeen sublayers 220-B-1 to 220-B-17 by dividing the layer B 220-B of the inference task 2 220 based on the PE array size.

Since the layer 1 220-1 of the inference task 2 220 is divided into the sublayers 220-1-1 and 220-1-2, the host 110 may form a group 2_1 including the sublayers 220-1-1 and 220-1-2. Since the layer 2 220-2 of the inference task 2 is divided into sixteen sublayers 220-2-1 to 220-2-16, the host 110 may form a group 2_2 including the sublayers 220-2-1 to 220-2-16. The layer B 220-B of the inference task 2 is divided into seventeen sublayers 220-B-1 to 220-B-17. In this case, the host 110 may form a group 2_B_1 including sixteen sublayers 220-B-1 to 220-B-16 and a group 2_B_2 including the remaining sublayer 220-B-17.

Table 2 below shows the group for each layer of the inference task 2 220.

TABLE 2

| Layer | Group |
| --- | --- |
| Layer 1 (220-1) | Group 2_1 |
| Layer 2 (220-2) | Group 2_2 |
| ... | ... |
| Layer B (220-B) | Group 2_13_1 and Group 2_13_2 |

The host 110 may record information of a group for each layer of the inference task 2 220 in a scheduling table 320 of the inference task 2 220, and transfer the scheduling table 320 to the accelerator 130.

Figure 4:
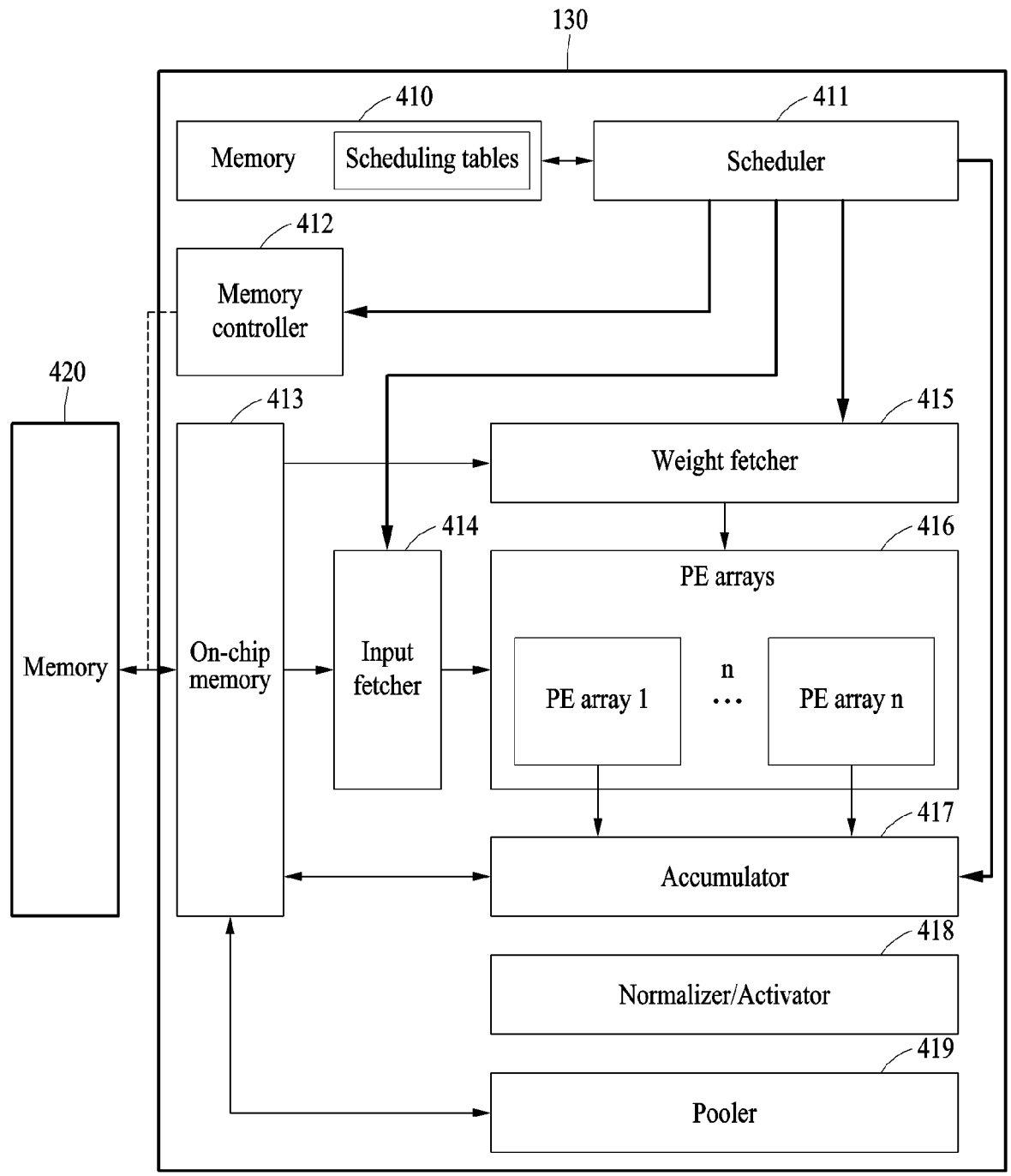
FIG. 4 illustrates an example of an accelerator.

FIG. 4 illustrates an example of an accelerator.

Referring to FIG. 4, the accelerator 130 includes a memory 410, a scheduler 411, a memory controller 412, an on-chip memory 413, an input fetcher 414, a weight fetcher 415, PE arrays 416, an accumulator 417, a normalizer/activator 418, and a pooler 419.

A memory 420 provided outside the accelerator 130 may correspond to the memory 120 described with reference to FIG. 1. The memory 420 may store input data and weights of groups. However, examples are not limited thereto, and the memory 420 may be a separate memory that is physically distinguished from the memory 120 described above.

The memory 410 in the accelerator 130 stores scheduling tables received from the host 110. For example, the memory 410 may store the scheduling table 310 of the inference task 1 210. Further, the memory 410 may store the scheduling table 320 of the inference task 2 220.

In an example, the memory 410 may be an SRAM. However, examples are not limited thereto.

The scheduler 411 may perform dynamic scheduling by referring to the scheduling table stored in the memory 410. The scheduler 411 will be described further later.

The memory controller 412 may store, in the on-chip memory 413, the input data and weights stored in the memory 420 outside the accelerator 130.

The input fetcher 414 may fetch input data of a group from the on-chip memory 413. The input data of the group may be a portion of the input data of the inference task. The input fetcher 414 may transfer the fetched input data to one or more PE arrays to which the group is assigned, among the PE arrays 416. For example, if a first group of the groups (for example, the groups in Table 1) is assigned to PE arrays 1 and 2, the input fetcher 414 may fetch input data of the first group stored in the on-chip memory 413 by referring to the scheduling table, and transfer the input data of the first group to the PE arrays 1 and 2. Here, the first group may be a highest priority group among the groups in Table 1.

The weight fetcher 415 may fetch weights of the group from the on-chip memory 413, and transfer the fetched weights to the PE arrays 416. The weights of the group may be a portion of the weights stored in the on-chip memory 413. For example, the weight fetcher 415 may fetch weights of the first group from the on-chip memory 413 by referring to the scheduling table, and transfer the weights of the first group to the PE arrays 1 and 2.

The PE arrays 416 may be multi-systolic arrays. The number of PE arrays 416 is n. Each of the PE arrays 416 may be a weight stationary systolic array and include, for example, PEs of a size of 128×128.

Each of the PE arrays 416 may perform an operation based on the received input data and weights. For example, each of the PE arrays 1 and 2 may perform an operation for the first group based on the input data and weights of the first group.

Each of the PE arrays 416 may transfer an operation result to the accumulator 417.

The accumulator 417 may perform a partial sum of operation results of the PE arrays 416. In this example, which operation results are to be subject to the partial sum may be determined by the scheduler 411. The accumulator 417 may store a result of the partial sum in the on-chip memory 413. The result of the partial sum may be used as input data for a group.

The accumulator 417 may transfer the result of the partial sum to the normalizer/activator 418.

The normalizer/activator 418 may implement a normalization/activation layer of the neural network. The normalizer/activator 418 may perform normalization and/or activation (for example, ReLU function) on the result of the partial sum.

The pooler 419 may implement a pooling layer of the neural network. The pooler 419 may perform pooling (for example, max pooling) on an output from the normalizer/activator 418. The pooler 419 may store a pooling result in the on-chip memory 413.

FIGS. 5 to 11 illustrate examples of scheduling by a scheduler in an accelerator.

Figure 5:
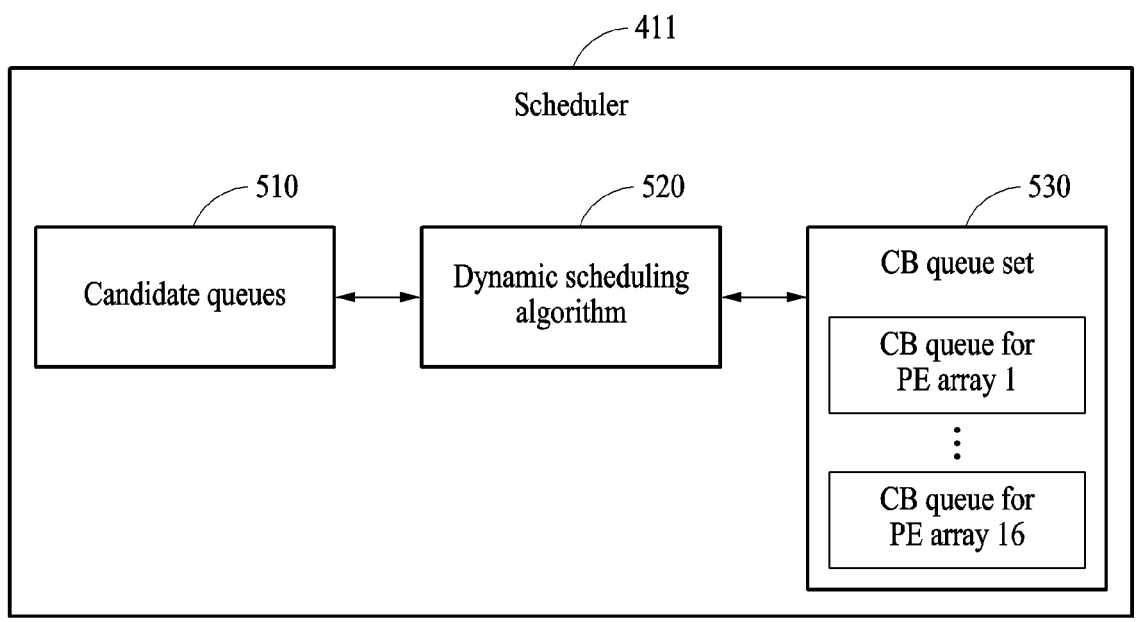
FIGS. 5 to 11 illustrate examples of scheduling by a scheduler.

Referring to FIG. 5, the scheduler 411 includes candidate queues 510, a dynamic scheduling algorithm 520, and a CB queue set 530.

Although it will be described later, groups with no dependency on a group for which an operation is performed may be inserted or enqueued in the candidate queues 510.

The CB queue set 530 may include a queue for each of the PE arrays 416. A CB of a group to be performed by each of the PE arrays 416 may be inserted or enqueued in the queue for each of the PE arrays 416. In other words, the CB queue set 530 may include a CB queue indicating a group of a CB that is to be performed (or is being performed) by each of the PE arrays 416.

Table 3 and Table 4 below show examples of the dynamic scheduling algorithm 520.

TABLE 3

Dynamic Scheduling Algorithm

| | |
|---|---|
| 1 | [whenever the previous sub-group's MB finished] |
| 2 | candidate = None |
| 3 | select the highest priority SG |
| 4 | candidate = selected SG |
| 5 | do COMPUTE(candidate) |
| 6 | for SG in SG_Q do |
| 7 | if SG.w_head, w_tail == candidate.w_head, w_tail |
| 8 | candidate = SQ |
| 9 | do COMPUTE_parallel(candidate) |
| 10 | else |
| 11 | do OVERLAP |
| 12 | start OVERLAP |
| 13 | remainder initialize |
| 14 | for SG in SG_Q do |
| 15 | if SG.MB.cycle < SRAM_C then |
| 16 | if SG.MB.cycle < remainder then |
| 17 | candidate = SG; |
| 18 | if candidate ! = None then |
| 19 | If E_sum < = 16 then |
| 20 | do COMPUTE(candidate) |
| 21 | remainder = remainder- candidate.MB.cycle |
| 22 | do OVERLAP again |
| 23 | end OVERLAP |
| 24 | start COMPUTE(candidate) |
| 25 | MB_C + = candidate.MB.cycle; |
| 26 | SRAM_C − = calididate. MB.cycle; |
| 27 | CB_PQ.push(candidate.CB) |
| 28 | SG_Q.pop(candidate) |
| 29 | end COMPUTE |
| 30 | start COMPUTE_parallel(candidate) |
| 31 | CB_PQ.push(candidate.CB) |
| 32 | SG_Q.pop(candidate) |
| 33 | end COMPUTE_parallel |

TABLE 4

Dynamic Scheduling Algorithm

| | |
|---|---|
| 1 | [whenever CBs in CB_PQ finishes] |
| 2 | for some PE arrays do |
| 3 | target= CB related with finished MB |
| 4 | CB_PQ.pop(target) |
| 5 | CB_Q_C.push(target cycle) |
| 6 | SRAM_C + = target.cycle; |
| 7 | for SG in SG_Q do |
| 8 | SG.priority = SG.priority * Slowdown; |
| 9 | [whenever all CBs in CB_PQ finishes] |
| 10 | CB_C + = MAX(CB_Q_C); |
| 11 | CB_Q_C.pop(target.cycle) |

In Table 3 and Table 4 above, SG denotes the group described above. SRAM_C denotes a time value calculated based on a residual capacity of the on-chip memory 413. This will be described further below.

CB_C denotes the cycle of the total CB performed, MB_C denotes the cycle of the total MB performed, and CB_Q_C denotes a cycle set of CBs performed in CB_Q in CB_PQ. Here, CB_PQ denotes the CB queue set 530, and CB_Q denotes the CBs queue for each PE array. SG_Q may denote the candidate queue 510 described above.

E_sum denotes the sum of the numbers of sublayers in groups to be processed in parallel (or performed simultaneously).

Hereinafter, a detailed operation of the scheduler 411 according to the dynamic scheduling algorithm 520 will be described with reference to FIGS. 6 to 11.

Figure 6:
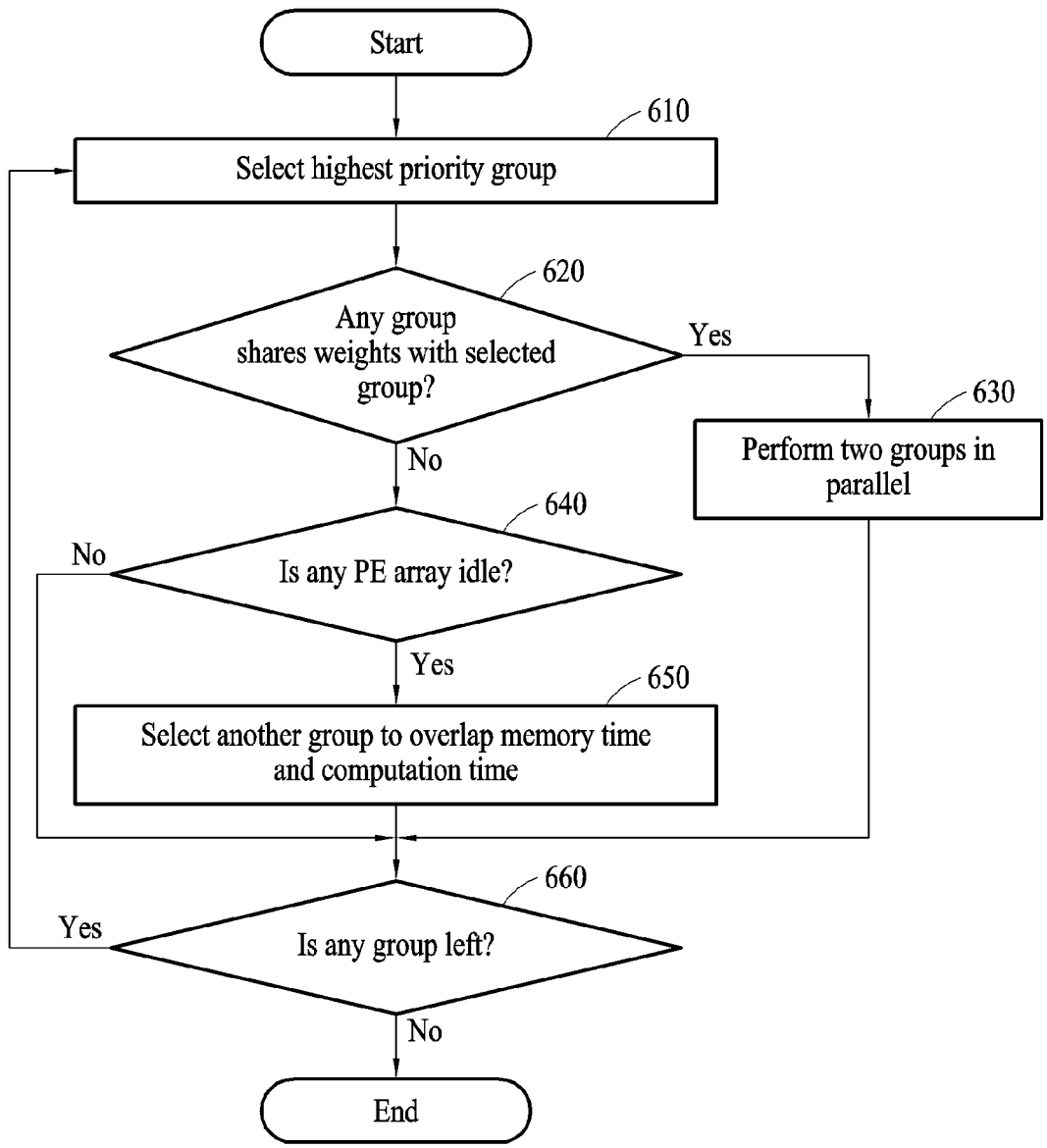
Figure 7:
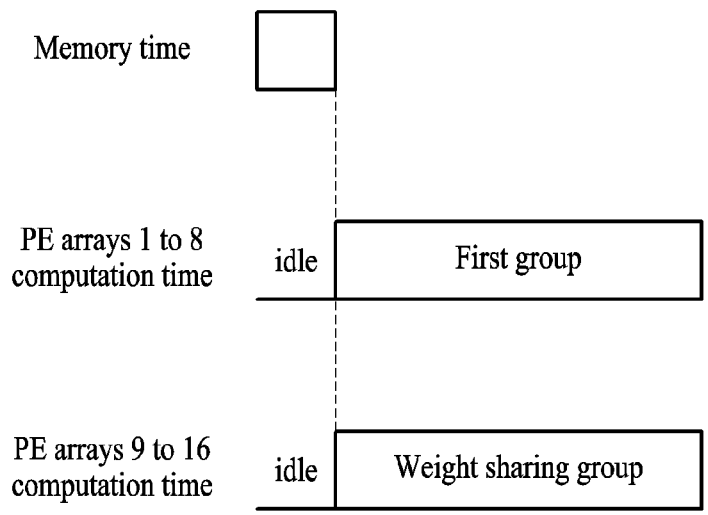

Referring to FIG. 6, a scheduling method of the scheduler 411 is shown. The operations in FIG. 6 may be performed in the sequence and manner as shown, although the order of some operations may be changed or some of the operations omitted without departing from the spirit and scope of the illustrative examples described. The scheduling method includes operations 610 to 660. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

In operation 610, the scheduler 411 may select a highest priority group from among groups. A priority of a group may be determined by a priority of an inference task of the group. For example, a priority of each of the groups in Table 1 may be determined by a priority of the inference task 1 210, and a priority of each of the groups in Table 2 may be determined by a priority of the inference task 2 220.

If the priorities of the groups are the same, the scheduler 411 may select a group to be performed first. For example, the groups in Table 1 are those generated from the inference task 1 210 and thus, may have the same priority. The scheduler 411 may select the group 1_1 of which the information is recorded on the top of the scheduling table 310 (that is, the group 1_1 to be performed first).

In operation 620, the scheduler 411 may verify whether any group shares weights with the selected group. If a first group with the highest priority is selected in operation 610, the scheduler 411 may verify whether any group shares weights of the first group. The group sharing the weights of the first group is referred to as the "weight sharing group".

If there is a weight sharing group of the first group, the scheduler 411 may cause the two groups (in other words, the first group and the weight sharing group) to be performed in parallel, in operation 630. For example, the scheduler 411 may assign the first group to half of the PE arrays 416 (for example, the PE arrays 1 to 8), and assign the weight sharing group to the other half the PE arrays 416 (for example, the PE arrays 9 to 16). The weight fetcher 415 may fetch the weights of the first group stored in the on-chip memory 413 and transfer the weights of the first group to the PE arrays 1 to 16. The input fetcher 414 may fetch the input data of the first group stored in the on-chip memory 413 and transfer the input data of the first group to the PE arrays 1 to 8. The input fetcher 414 may fetch the input data of the weight sharing group stored in the on-chip memory 413 and transfer the input data of the weight sharing group to the PE arrays 9 to 16.

The PE arrays 1 to 8 may generate an operation result for the first group by performing an operation based on the input data and weights of the first group. The PE arrays 9 to 16 may generate an operation result for the weight sharing group by performing an operation based on the input data and weights of the weight sharing group. Thus, as in the example of FIG. 7, the PE arrays 416 may process the first group and the weight sharing group in parallel. In some examples, there may be multiple weight sharing groups. In this case, the scheduler 411 may perform scheduling to process the first group and the weight sharing groups in parallel. As an example, if there are two weight sharing groups, the scheduler 411 may divide "16" which is the number of PE arrays 416 by "3" which is the sum of "1" which is the number of first groups and "2" which is the number of weight sharing groups. When divided, the quotient is "5", and the remainder is "1". In this case, the scheduler 411 may assign six PE arrays to the first group, five PE arrays to the first weight sharing group, and five PE arrays to the second weight sharing group. As an example, if there are three weight sharing groups, the scheduler 411 may divide "16" which is the number of PE arrays 416 by "4" which is the sum of "1" which is the number of first groups and "3" which is the number of weight sharing groups. When divided, the quotient is "4", and there is no remainder. The scheduler 411 may assign four PE arrays to each of the first group and the three weight sharing groups.

Referring to FIG. 6 again, if no group shares the weights of the first group, the scheduler 411 may verify whether any PE array is idle, in operation 640. The scheduler 411 may determine that no PE array is idle if all the PE arrays 416 are performing the first group, and determine that there are idle PE arrays if a portion of the PE arrays 416 is performing the first group. In operation 640, to verify whether any PE array is idle, the scheduler 411 may verify whether the number of sublayers included in the first group is less than the number of PE arrays 416. In other words, the scheduler 411 may verify whether the size of the weights of the first group is less than the total size of the PE arrays 416.

If no PE array is idle, the scheduler 411 may verify whether any groups requiring an operation are left, in operation 660. If there remain groups requiring an operation, the scheduler 411 may select a highest priority group from among the remaining groups, in operation 610.

If there is an idle PE array, the scheduler 411 may select another group to overlap a memory time and a calculation time, in operation 650. In other words, the scheduler 411 may select a second group having a memory time overlapping a computation time of the first group. In operation 660, the scheduler 411 may verify whether any groups requiring an operation are left if the second group is selected. If there remain groups, the scheduler 411 may perform operation 610.

Hereinafter, operation 650 will be described in detail.

The scheduler 411 may define (or determine) a cycle of a CB of the first group as a remainder by referring to the scheduling table stored in the memory 410. Here, the cycle of the CB of the first group may be a predicted value of the computation time of the first group.

The scheduler 411 may identify one or more groups with no dependency on the first group by referring to the scheduling table stored in the memory 410, and enqueue the identified groups in the candidate queues 510. The scheduler 411 may determine whether the sum of the size of weights of a first enqueued group among the enqueued groups and the size of the weights of the first group exceeds the size of the PE arrays 416. In other words, the scheduler 411 may determine whether the sum of the number of sublayers included in the first enqueued group and the number of sublayers included in the first group (that is, E_sum in the algorithm of Table 3 above) exceeds the number of PE arrays 416.

If the sum of the size of the weights of the first enqueued group and the size of the weights of the first group is less than the size of the PE arrays 416, the scheduler 411 may calculate a predicted value of a time taken to move data with a size corresponding to the residual capacity (or residual size) of the on-chip memory 413 to the PE arrays 416 (that is, SRAM_C in the algorithms of Table 3 and Table 4 above).

The scheduler 411 may obtain a cycle of an MB of the first enqueued group from the scheduling table. A cycle of an MB of a group is expressed by MB.cycle in the algorithm of Table 3 above. The cycle of the MB of the first enqueued group may be a predicted value of a memory time of the first enqueued group (that is, a transfer time consumed to transfer the weights to the PE arrays 416). The scheduler 411 may determine whether the cycle of the MB of the first enqueued group exceeds SRAM_C.

If the cycle of the MB of the first enqueued group is less than SRAM_C (that is, if the predicted value of the memory time of the first enqueued group is less than SRAM_C), the scheduler 411 may determine whether the cycle of the MB of the first enqueued group is less than the remainder described above (that is, the cycle of the CB of the first group). If the cycle of the MB of the first enqueued group is less than the remainder, the scheduler 411 may select the first enqueued group as a second group.

The scheduler 411 may assign one or more PE arrays to the second group. The scheduler 411 may assign a number of PE arrays to the second group. The number of PE arrays assigned may correspond to the number of sublayers in the second group. For example, if the second group includes four sublayers, the scheduler 411 may assign four PE arrays to the second group.

Figure 8:
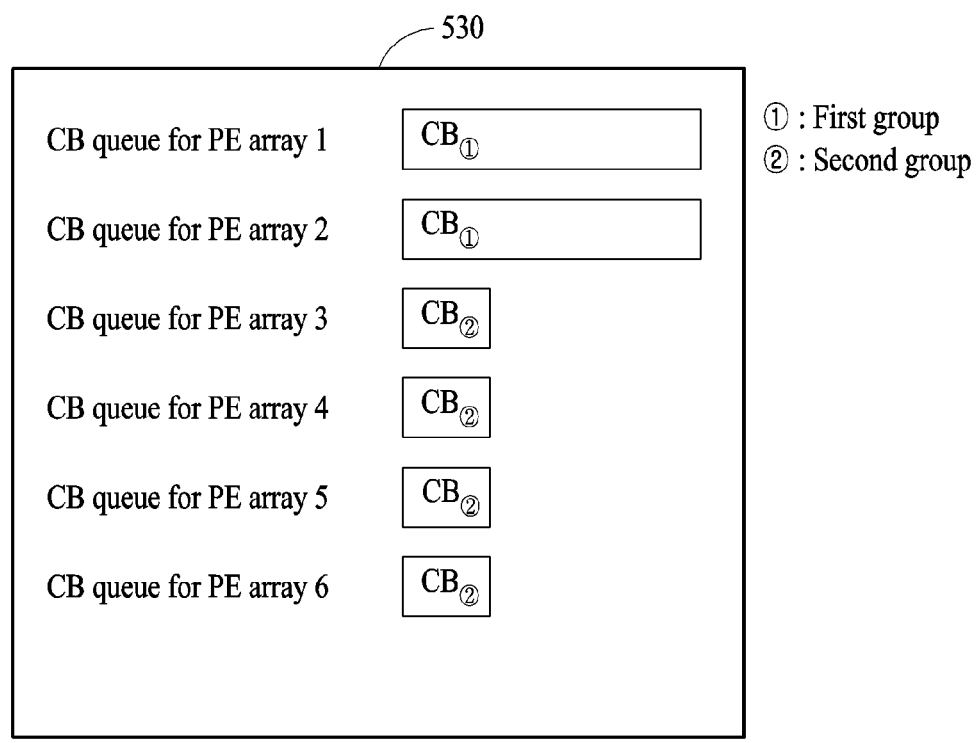

The scheduler 411 may manage which PE array performs a CB of which group. For example, if the first group is to be performed by the PE arrays 1 and 2, the scheduler 411 may enqueue the CB of the first group in a queue for each of the PE arrays 1 and 2 in the CB queue set 530, as shown in the example of FIG. 8. If the second group is to be performed by the PE arrays 3 to 6, the scheduler 411 may enqueue the CB of the second group in a queue for each of the PE arrays 3 to 6. Although it will be described later with reference to FIG. 9, the PE arrays 3 to 6 may perform an operation for the first group before performing an operation for the second group. In this case, in some examples, the CB of the first group may be further enqueued in a queue for each of the PE arrays 3 to 6.

Figure 9:
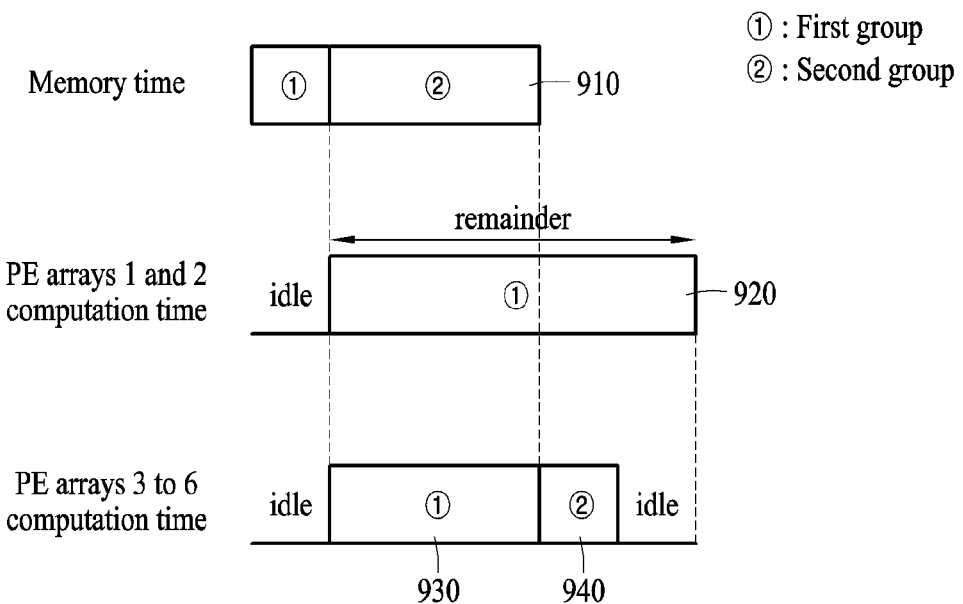

Referring to FIG. 9, the PE arrays 1 and 2 may perform an operation for the first group.

In the example of FIG. 9, the PE arrays 7 to 16 are not assigned the first group and the second group. Thus, the PE arrays 7 to 16 may be idle during a computation time 920 of the PE arrays 1 and 2. The scheduler 411 may cause the PE arrays 7 to 16 not to be idle but to perform the operation for the first group so that the first group may be processed faster. For example, the cycle of the CB of the first group may be greater than the cycle of the CB of the second group. In other words, the CB of the first group may be longer than the CB of the second group. The scheduler 411 may schedule the PE array 7 to 16 to perform the operation for the first group so that the first group may be processed faster.

Further, the PE arrays 3 to 6 may be idle before performing the second group. In this case, the scheduler 411 may cause the PE arrays 3 to 6 to perform the operation for the first group before performing the second group, so that the first group may be processed faster.

During the computation time 920 of the PE arrays 1 and 2, the weights of the second group may be transferred through the weight fetcher 415 to the PE arrays 3 to 6, and the input data of the second group may be transferred through the input fetcher 414 to the PE arrays 3 to 6. In other words, the weights and input data of the second group may be transferred to the PE arrays 3 to 6 during a memory time 910 of the second group. As in the example of FIG. 9, the memory time 910 of the second group may overlap the computation time 920 and a computation time 930 of the first group. As a result, resource efficiency may improve.

The PE arrays 3 to 6 may receive the weights and input data of the second group and perform an operation for the second group based on the weights and input data of the second group. The computation time 930 and the memory time 910 may be identical. The PE arrays 3 to 6 may perform the operation for the second group during a computation time 940. As in the example of FIG. 9, the first group and the second group may be processed in parallel by the PE arrays 416. As a result, resource efficiency may improve.

In an examples, if the sum of the size of the weights of the first group and the size of the weights of the second group is less than the size of the PE arrays 416, the scheduler 411 may select a third group with no dependency on the first group and the second group. In other words, the scheduler 411 may select the third group if the PE arrays 416 is still capable of parallel processing. Hereinafter, the selection of the third group will be described.

The scheduler 411 may calculate a difference value between the cycle of the CB of the first group and the cycle of the MB of the second group, and update the previously defined remainder with the calculated difference value. In other words, the scheduler 411 may update the remainder defined as the cycle of the CB of the first group with "the cycle of the CB of the first group—the cycle of the MB of the second group".

The scheduler 411 may calculate the sum of the size of the weights of the first group, the size of the weights of the second group, and the size of the weights of the second enqueued group in the candidate queues 510, and determine whether the calculated sum of the sizes exceeds the size of the PE arrays 416. In other words, the scheduler 411 may calculate the sum of the number of sublayers included in the first group, the number of sublayers included in the second group, and the number of sublayers included in the second enqueued group, and determine whether the calculated sum of the numbers exceeds the number of PE arrays 416.

The scheduler 411 may update SRAM_C if the calculated sum of the sizes does not exceed the size of the PE arrays 416. For example, the scheduler 411 may confirm the residual capacity of the on-chip memory 413 again and update SRAM_C based on the confirmed residual capacity. The scheduler 411 may verify whether the cycle of the MB of the second enqueued group is less than the updated SRAM_C.

If the cycle of the MB of the second enqueued group is less than the updated SRAM_C, the scheduler 411 may determine whether the cycle of the MB of the second enqueued group is less than the updated remainder.

If the cycle of the MB of the second enqueued group is less than the updated remainder, the scheduler 411 may select the second enqueued group as a third group.

The scheduler 411 may assign one or more PE arrays to the third group. For example, in the example described above with reference to FIG. 9, the PE arrays 7 to 16 are processing the first group together with the PE arrays 1 and 2. Thus, the scheduler 411 may assign the PE arrays 7 to 16 to the third group.

Figure 10:
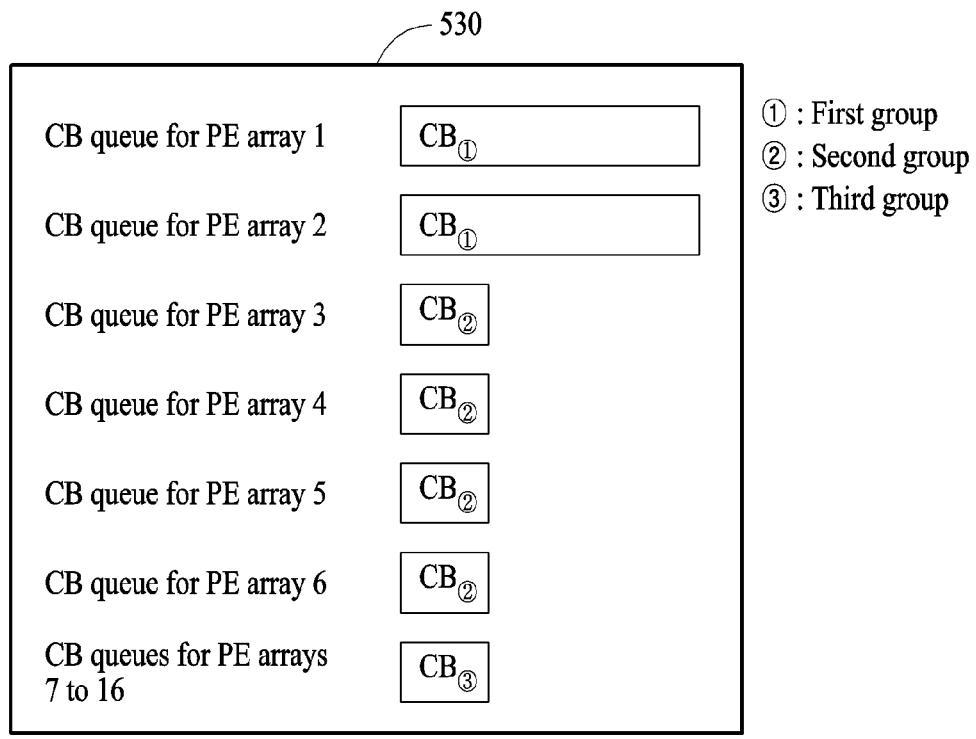

The scheduler 411 may enqueue a CB of the third group in queues for the PE arrays 7 to 6 in the CB queue set 530, as shown in the example of FIG. 10.

Figure 11:
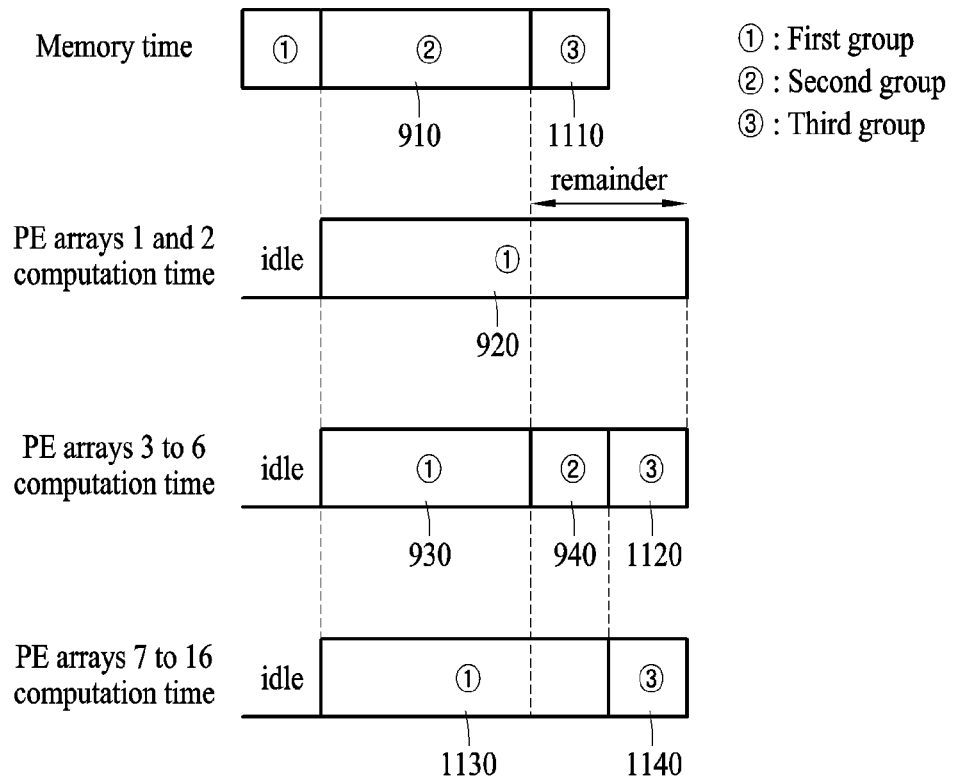

Examples of a memory time and computation times of the PE arrays 416 are shown in FIG. 11.

Referring to the memory time shown in FIG. 11, the weights and input data of the third group may be transferred to the PE arrays 7 to 16 during a memory time 1110. The memory time 1110 of the third group may overlap a computation time 920, a computation time 940, and a computation time 1130. Thus, the third group may be processed faster.

The PE arrays 7 to 16 may perform an operation for the third group through the weights and input data of the third group during a computation time 1140.

If the PE arrays 3 to 6 terminate the operation for the second group (that is, if the computation time 940 ends), the scheduler 411 may cause the PE arrays 3 to 6 to perform the operation for the third group such that the PE arrays 3 to 6 may not be idle. The PE arrays 3 to 6 may perform the operation for the third group during a computation time 1120 after terminating the operation for the second group.

As in the example of FIG. 11, the PE arrays 416 may process the first to third groups in parallel, whereby the resources may be efficiently utilized.

Figure 12:
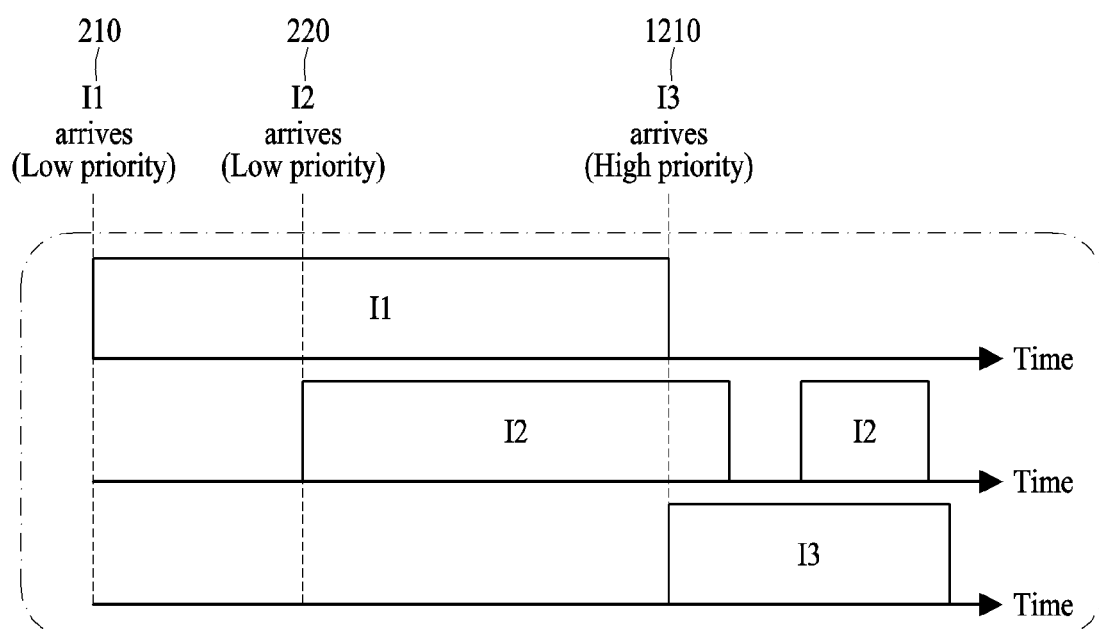
FIG. 12 illustrates an example of parallel processing of multiple inference tasks.

FIG. 12 illustrates an example of parallel processing of multiple inference tasks.

Referring to FIG. 12, the accelerator 130 processes the inference task 1 210.

If the host 110 has the inference task 2 220, the scheduler 411 may operate according to the dynamic scheduling algorithm 520 (or the scheduling method described above) to schedule the PE arrays 416 to process the inference task 1 210 and the inference task 2 220 in parallel.

If the host 110 has an inference task 3 1210, the host 110 may generate a scheduling table of the inference task 3 1210, and transfer the scheduling table of the inference task 3 1210 to the accelerator 130. The scheduler 411 may schedule the PE arrays 416 to perform multiple groups in parallel by referring to the scheduling table 320 of the inference task 2 220 and the scheduling table of the inference task 3 1210. In this example, the inference task 3 1210 has a priority over the inference task 2 220. Thus, the scheduler 411 may schedule the inference task 3 1210 to be processed with priority. As in the example of FIG. 12, the accelerator 130 may process the inference task 2 220 and the inference task 3 1210 in parallel.

Figure 13:
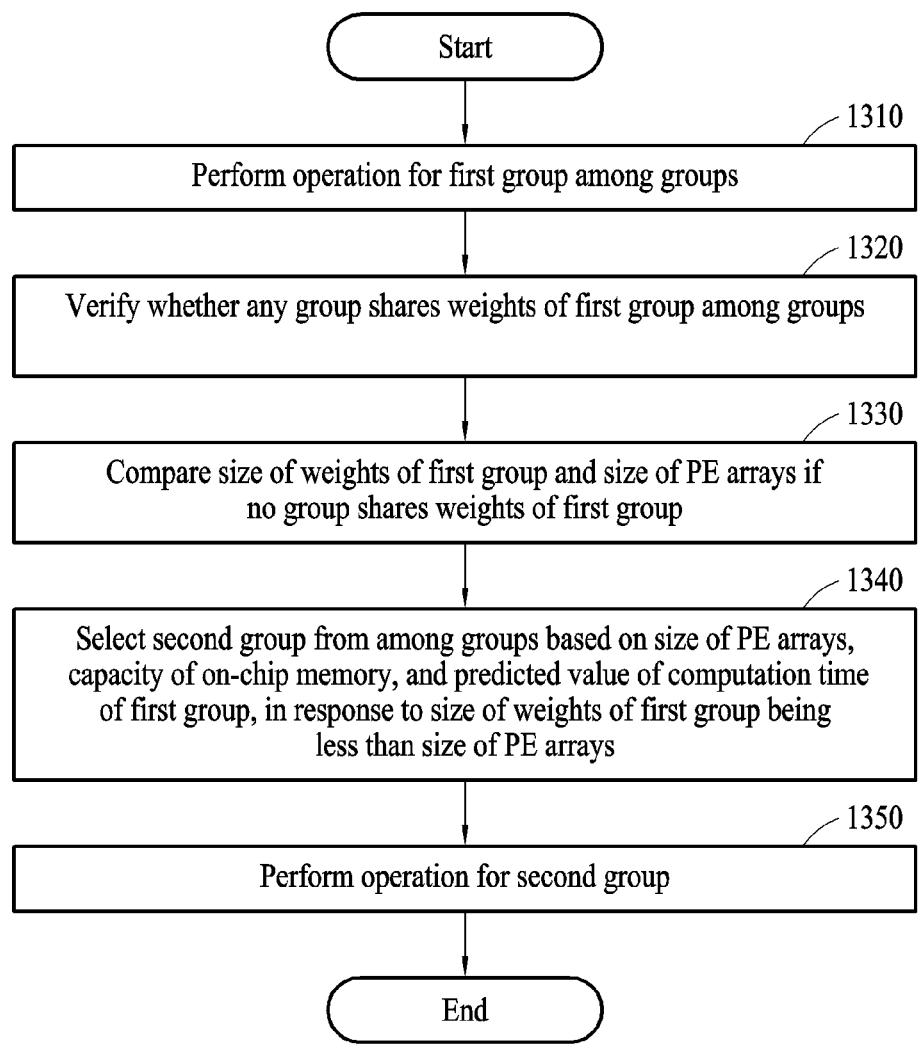
FIG. 13 illustrates an example of a method of operating an accelerator.

FIG. 13 illustrates an example of an operating method of an accelerator. The operations in FIG. 13 may be performed in the sequence and manner as shown, although the order of some operations may be changed or some of the operations omitted without departing from the spirit and scope of the illustrative examples described. Many of the operations shown in FIG. 13 may be performed in parallel or concurrently. One or more blocks of FIG. 13, and combinations of the blocks, can be implemented by special purpose hardware-based computer, such as a processor, that perform the specified functions, or combinations of special purpose hardware and computer instructions.

Referring to FIG. 13, in operation 1310, the accelerator 130 may perform an operation for a first group among groups, which include sublayers for each layer of an inference task.

In operation 1320, the accelerator 130 may verify whether any group shares weights of the first group from among the groups.

If no group shares the weights of the first group, the accelerator 130 may compare the size of the weights of the first group and the size of the PE arrays 416, in operation 1330. In other words, the accelerator 130 may compare the number of sublayers in the first group and the number of PE arrays.

If the size of the weights of the first group is less than the size of PE arrays 416, the accelerator 130 may select a second group from among the groups based on the size of PE arrays 416, a capacity of the on-chip memory 413, and a predicted value of a computation time of the first group (the cycle of the CB of the first group described above), in operation 1340.

In operation 1340, the accelerator 130 may identify one or more groups with no dependency on the first group by referring to a table containing information of the groups (for example, the scheduling table described above), and enqueue the identified one or more groups in the candidate queues 510. The accelerator 130 may determine whether the sum of the size of the weights of the first group and the size of the weights of the first enqueued group exceeds the size of PE arrays 416. In other words, the accelerator 130 may determine whether the sum of the number of sublayers included in the first group and the number of sublayers included in the first enqueued group exceeds the number of PE arrays 416.

If the calculated sum of the sizes (or the calculated sum of the numbers) is less than the size of PE arrays 416 (or the number of PE arrays 416), the accelerator 130 may determine whether a predicted value of a transfer time of the weights of the first enqueued group (that is, the cycle of the MB of the first enqueued group) exceeds a time value (that is, SRAM_C described above) calculated based on a residual capacity of the on-chip memory 413.

If the predicted value of the transfer time of the weights of the first enqueued group is less than the time value (that is, SRAM_C) described above, the accelerator 130 may determine whether the predicted value of the transfer time of the weights of the first enqueued group is less than a predicted value of a computation time of the first group (that is, the cycle of the CB of the first group). If the predicted value of the transfer time of the weights of the first enqueued group is less than the predicted value of the computation time of the first group, the accelerator 130 may select the first enqueued group as the second group.

The accelerator 130 may allocate one or more PE arrays to the second group.

In operation 1350, the accelerator 130 performs an operation for the second group.

In an example, if the sum of the size of the weights of the first group and the size of the weights of the second group is less than the size of the PE arrays 416, the accelerator 130 may select a third group with no dependency on the first and second groups based on the size of the PE arrays 416, the residual capacity of the on-chip memory 413, the predicted value of the computation time of the first group, and the predicted value of the transfer time of the weights of the second group. If the third group is selected, the accelerator 130 may allocate one or more PE arrays to the third group.

The description provided with reference to FIGS. 1 through 12 may also apply to the description of FIG. 13, and thus a detailed description will be omitted for conciseness.

The processing apparatus 100, accelerator 130, scheduler 411, memory controller 412, input fetcher 414, weight fetcher 415, PE arrays 416, accumulator 417, a normalizer/activator 418, and a pooler 419, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of operating an accelerator. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque(STT)-MRAM, static random-access memory (SRAM), thyristor RAM (T-RAM), zero capacitor RAM (Z-RAM), twin transistor RAM (TTRAM), conductive bridging RAM(CBRAM), ferroelectric RAM (FeRAM), phase change RAM (PRAM), resistive RAM(RRAM), nanotube RRAM, polymer RAM (PoRAM), nano floating gate Memory(NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of operating an accelerator, the method comprising:
   determining whether any group shares weights of a first group from among groups;
   determining a presence of an idle processing element (PE) array, in response to no group sharing the weights of the first group; and
   selecting a second group having a memory time overlapping a computation time of the first group from among the groups, in response to the idle PE array being present.

2. The operating method of claim 1, wherein the groups comprise groups of sublayers generated by dividing layers of one or more inference tasks.

3. The operating method of claim 1, wherein the determining the presence of the idle PE array comprises:
   comparing a size of PE arrays and a size of the weights of the first group; and
   determining the idle PE array, in response to the size of the weights of the first group being less than the size of the PE arrays.

4. The operating method of claim 1, wherein the selecting of the second group comprises selecting the second group from among the groups based on a size of PE arrays in the accelerator, a capacity of an on-chip memory in the accelerator, and a predicted value of the computation time of the first group.

5. The operating method of claim 1, wherein the selecting of the second group comprises:
   identifying one or more groups with no dependency on the first group based on a table comprising information of the groups;
   enqueuing the identified one or more groups in a candidate queue;
   determining whether a sum of a size of the weights of the first group and a size of weights of a first enqueued group in the candidate queue exceeds a size of PE arrays;

determining whether a predicted value of a transfer time of the weights of the first enqueued group exceeds a time value calculated based on a residual capacity of the on-chip memory, in response to the sum of the size of the weights being less than the size of the PE arrays;

determining whether the predicted value of the transfer time of the weights of the first enqueued group is less than a predicted value of a computation time of the first group, in response to the predicted value of the transfer time of the weights of the first enqueued group being less than the time value; and selecting the first enqueued group as the second group, in response to the predicted value of the transfer time of the weights of the first enqueued group being less than the predicted value of the computation time of the first group.

6. The operating method of claim 5, wherein the predicted value of the transfer time is a predicted value of a time to transfer the weights of the first enqueued group from a memory of a host to the accelerator.

7. The operating method of claim 1, wherein the memory time of the second group is a time to transfer weights of the second group to the accelerator.

8. The operating method of claim 1, further comprising: selecting a third group from among groups with no dependency on the first and second groups based on a size of PE arrays in the accelerator, a residual capacity of an on-chip memory in the accelerator, a predicted value of the computation time of the first group, and a predicted value of a transfer time of weights of the second group, in response to the sum of a size of the weights of the first group and a size of the weights of the second group being less than a size of the PE arrays.

9. The operating method of claim 8, wherein the selecting of the third group comprises:
calculating a difference value between the predicted value of the computation time of the first group and the predicted value of the transfer time of the weights of the second group;
calculating a sum of the size of the weights of the first group, the size of the weights of the second group, and a size of weights of any one of the groups with no dependency on the first and second groups;
determining whether the calculated sum exceeds the size of the PE arrays;
determining whether a predicted value of a transfer time of the weights of the any one group exceeds a time value calculated based on the residual capacity of the on-chip memory in the accelerator, in response to the calculated sum being less than the size of the PE arrays;
determining whether a predicted value of a transfer time of weights of the any one group is less than the calculated difference value, in response to the predicted value of the transfer time of the weights of the any one group being less than the time value; and
selecting the any one group as the third group, in response to the predicted value of the transfer time of the weights of the any one group being less than the calculated difference value.

10. The operating method of claim 1, wherein the first group is a highest priority group from among the groups.

11. An accelerator, comprising:
processing element (PE) arrays; and
a scheduler configured to determine whether any group shares weights of a first group among groups, to determine a presence of an PE array from among the PE arrays, in response to no group sharing the weights of the first group, and to select a second group having a memory time overlapping a computation time of the first group from among the groups, in response to the idle PE array being present.

12. The accelerator of claim 11, wherein the groups comprise groups of sublayers generated by dividing layers of one or more inference tasks.

13. The accelerator of claim 11, wherein the scheduler is further configured to compare a size of the PE arrays and a size of the weights of the first group, and to determine the idle PE array, in response to the size of the weights of the first group being less than the size of the PE arrays.

14. The accelerator of claim 11, wherein the scheduler is further configured to select the second group from among the groups based on a size of the PE arrays, a capacity of an on-chip memory in the accelerator, and a predicted value of the computation time of the first group.

15. The accelerator of claim 11, wherein the scheduler is further configured to:
identify one or more groups with no dependency on the first group based on a table comprising information of the groups,
enqueue the identified one or more groups in a candidate queue,
determine whether a sum of a size of the weights of the first group and a size of weights of a first enqueued group in the candidate queue exceeds a size of PE arrays,
determine whether a predicted value of a transfer time of the weights of the first enqueued group exceeds a time value calculated based on a residual capacity of the on-chip memory, in response to the sum of the size of the weights being less than the size of the PE arrays,
determine whether the predicted value of the transfer time of the weights of the first enqueued group is less than a predicted value of a computation time of the first group, in response to the predicted value of the transfer time of the weights of the first enqueued group being less than the time value, and
select the first enqueued group as the second group, in response to the predicted value of the transfer time of the weights of the first enqueued group being less than the predicted value of the computation time of the first group.

16. The accelerator of claim 15, wherein the predicted value of the transfer time comprises a predicted value of a time to transfer the weights of the first enqueued group from a memory of a host to the accelerator.

17. The accelerator of claim 11, wherein the memory time of the second group comprises a time to transfer weights of the second group to the accelerator.

18. The accelerator of claim 11, wherein the scheduler is further configured to select a third group from among groups with no dependency on the first and second groups based on a size of the PE arrays, a residual capacity of an on-chip memory in the accelerator, a predicted value of the computation time of the first group, and a predicted value of a transfer time of weights of the second group, in response to the sum of a size of the weights of the first group and a size of the weights of the second group being less than a size of the PE arrays.

19. The accelerator of claim 18, wherein the scheduler is further configured to:
calculate a difference value between the predicted value of the computation time of the first group and the predicted value of the transfer time of the weights of the second group, calculate a sum of the size of the weights of the first group, the size of the weights of the second group, and a size of weights of any one of the groups with no dependency on the first and second groups, determine whether the calculated sum exceeds the size of the PE arrays, determine whether a predicted value of a transfer time of the weights of the any one group exceeds a time value calculated based on the residual capacity of the on-chip memory in the accelerator, in response to the calculated sum being less than the size of the PE arrays, determine whether a predicted value of a transfer time of weights of the third group is less than the calculated difference value, in response to the predicted value of the transfer time of the weights of the any one group being less than the time value, and select the any one group as the third group, in response to the predicted value of the transfer time of the weights of the any one group being less than the calculated difference value.

20. The accelerator of claim 11, wherein the first group is a highest priority group from among the groups.

\* \* \* \* \*